Feb. 27, 1934.  F. W. PETERS  1,948,868
FLEXIBLE COUPLING
Filed Nov. 17, 1930   2 Sheets-Sheet 1

Frederick W. Peters, INVENTOR
BY Hull, Brock & West.
ATTORNEYS.

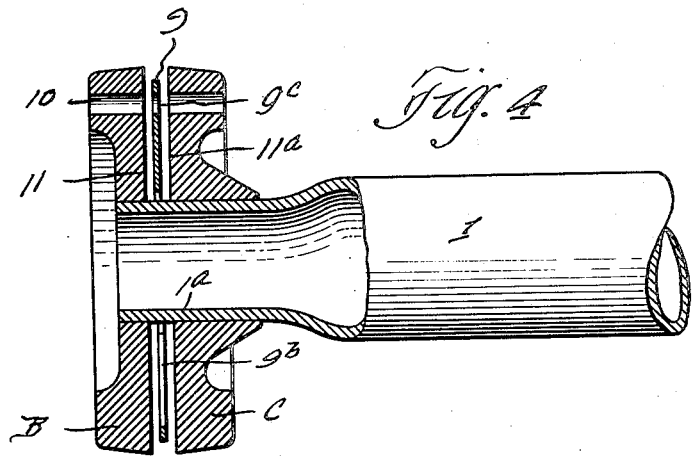
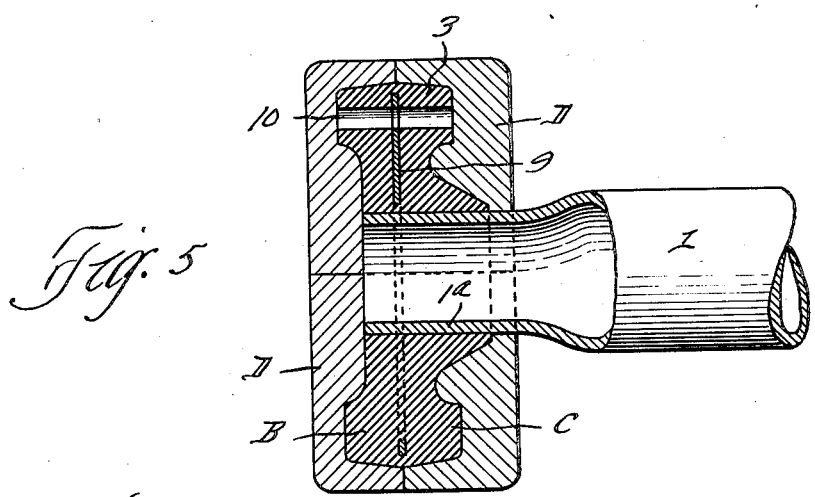
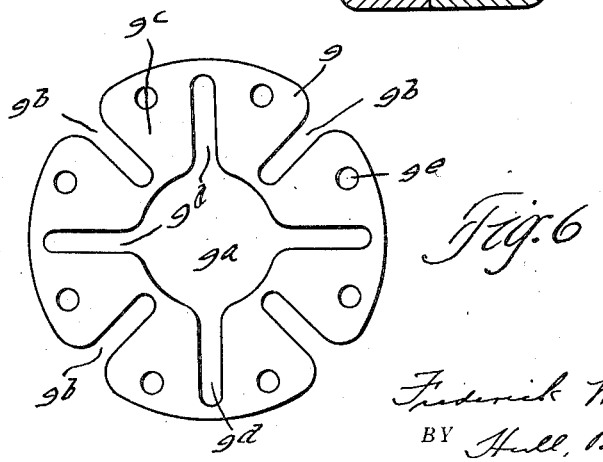

Patented Feb. 27, 1934

1,948,868

UNITED STATES PATENT OFFICE 1,948,868

FLEXIBLE COUPLING

Frederick W. Peters, Cleveland, Ohio

Application November 17, 1930
Serial No. 496,159

7 Claims. (Cl. 64—96)

This invention relates to flexible couplings, and more particularly to couplings of the type employing a body of resilient deformable material which is rigidly connected to one of the members to be coupled and detachably connected to the other of such members.

It is the general purpose and object of the invention to provide a coupling of this character which is simple in construction and economical of production and which will withstand all the ordinary incidents of use over a prolonged period of time.

Figure 1:
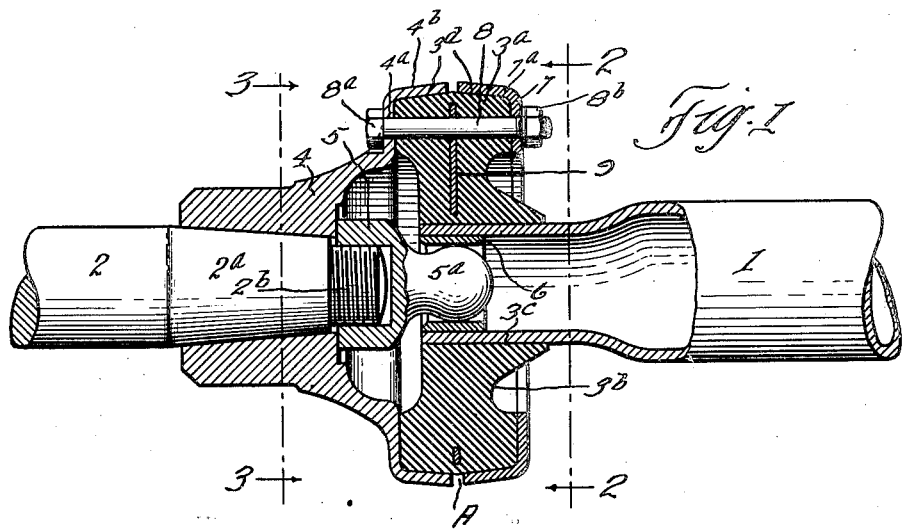
Figure 2:
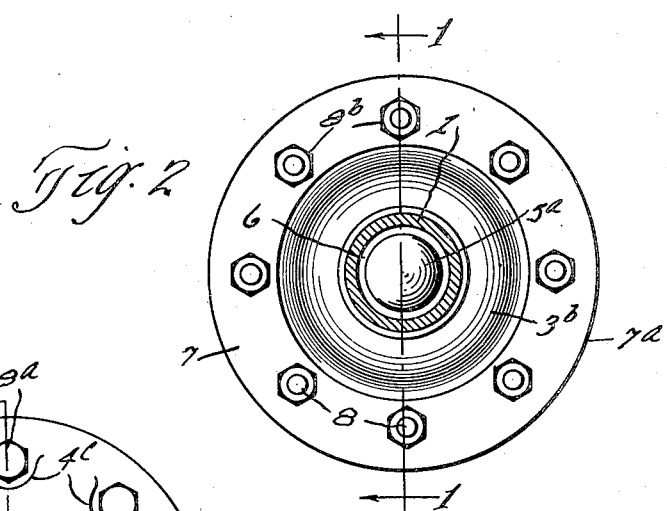
Figure 3:
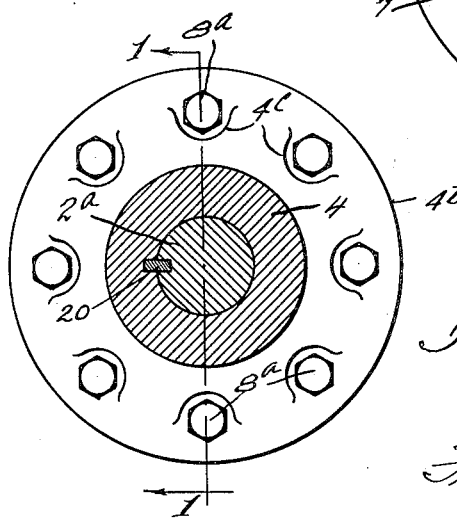

Further and more limited objects of the invention will appear hereinafter and will be realized through the construction and arrangement of parts shown in the drawings wherein Fig. 1 represents a sectional view through a coupling embodying my invention, the section being taken on the line 1—1 of Figs. 2 and 3, certain parts being shown in elevation; Fig. 2 a detail in section taken on the line 2—2 of Fig. 1; Fig. 3 a detail in section corresponding to the line 3—3 of Fig. 1; Fig. 4 a detail in section showing the manner of assembling the parts of the resilient deformable body; Fig. 5 a view similar to Fig. 4 showing the manner in which the parts of the deformable body and the interposed reinforcement are united for vulcanization in a mold; and Fig. 6 a plan view of the reinforcing member.

Describing the parts by reference characters, 1 and 2 represent the members which are to be connected, the member 1 being tubular and having securely attached to one end thereof, as by vulcanization, a ring body 3 of deformable resilient material, such as soft rubber, and which is capable of being so vulcanized to the member 1 or to an intermediate connecting member on the member 1. The ring-like body 3 comprises a widened outer portion $3^a$ connected by a reduced intermediate portion $3^b$ with the widened inner portion $3^c$ which is vulcanized to the end of the member 1. Where the ring body 3 is vulcanized directly to the end of the tubular member 1, said tubular member may be roughened in order to form a more secure connection between the said body and the said member.

The end of the member 2 which is in proximity to the ring-carrying end of the member 1 is tapered, as shown at $2^a$ for the reception of a hub 4, the hub being secured on such tapered end by means of a key 20 and a nut 5 threaded onto the inner reduced end $2^b$ of the member 2. This nut is shown as provided with a spherical extension $5^a$ which is received within and engages the inner surface of the collar 6 within the adjacent end of the member 1. The hub 4 is provided with a radially extending flange $4^a$ from the outer end of which there extends a frusto-conical flange $4^b$, the said flange flaring radially outwardly from its connection with the flange $4^a$ and conforming to the correspondingly flared outer portion $3^d$ of the ring.

Cooperating with the clamping device formed by the flanges $4^a$ and $4^b$, is a clamping ring comprising the flanges 7, $7^a$, which are of the same shape as the flanges $4^a$ and $4^b$, respectively, and which engage respectively the adjacent side and the outer surface $3^d$ of the ring 3. The flange $4^a$ is provided with recesses $4^c$ for the heads $8^a$ of bolts 8, which bolts extend through said flange, through the ring 3, and through openings in the flange 7 of the clamping ring, the ends of said ports being provided with nuts $8^b$.

In order to reinforce the ring, I have provided the same with a reinforcing plate, indicated generally at 9 and having a central opening $9^a$ of somewhat greater diameter than the external diameter of the part of the member 1 therewithin.

It will be noted that this reinforcing plate is provided with a plurality of radial grooves $9^b$ extending inwardly from the peripheral portion thereof, four such grooves being shown, the plate being quatrefoliated, having four segments $9^c$, the plate approximating the shape of a four-leaf clover. It will be noted further that the plate is provided also with radial grooves $9^d$ extending outwardly from the central opening $9^a$ thereof, each groove extending approximately centrally of a segment $9^c$ and terminating short of the outer end of such segment. In addition, the reinforcing plate is provided with openings $9^e$ for the reception of the bolts 8.

It will be noted that, when the clamping ring 7 is secured in place, a space A is provided between the proximate edges of the flanges $7^a$ and $4^b$, this space serving to accommodate any outward distension of the part $3^a$ of the body 3 due to setting up the nuts on the bolts 8.

In Figs. 4 and 5, there is shown the manner in which the ring body 3 and its reinforcement are applied to and vulcanized in place on the reduced inner end of the member 1. As will be seen from these views, the ring body, prior to its assembly and vulcanization is composed of two parts B and C adapted, when moved into engagement with the plate 9 interposed therebetween, to be vulcanized thereto and to form therewith the reinforced body shown in Fig. 1. It will be noted that each of the parts B and C is provided with openings 10, adapted to register with each other and with the openings 9ᶜ in the plate 9 for the reception of the bolts 8 and that each has an annular face 11, 11ᵃ, respectively, adapted to engage the opposite faces of the plate 9. It will be noted further that the central opening 9ᵃ of the plate 9 is of greater diameter than the external diameter of the reduced end 1ᵃ of the shaft member 1 to which it is applied.

With the parts of the ring body constructed and arranged as described and assembled within a mold D, which presses the adjacent faces 11, 11ᵃ of the rubber parts B and C into engagement with opposite sides of the plate 9 and into engagement with each other beyond the periphery of said plate, within the inner opening 9ᵃ of such plate, and through the slots 9ᵇ and 9ᵈ, the said parts B and C and the interposed plate may be united into the complete reinforced ring body shown in Fig. 1.

It will be obvious that power applied to either member 1 or 2 will be transmitted through the ring to the other of said members. By narrowing the intermediate portion 3ᵇ of this ring body, as shown, the body is made sufficiently flexible to accommodate some variations in and by making the central opening of the plate of greater diameter than the internal diameter of the ring, the alignment of the members 1 and 2.

It will be noted that the members 1 and 2 may be quickly and conveniently connected through the ring 3 and the clamping flanges 4ᵃ and 7 and that the parts may be as quickly and conveniently disassembled should occasion require. It will be noted further that the construction is extremely simple and economical of production.

Having thus described my invention, what I claim is:—

1. A flexible coupling for a driving member and a driven member, the said coupling comprising a continuous ring-like body of deformable resilient material having an outer relatively thick peripheral portion, an intermediate portion of materially less thickness and an inner relatively thick portion secured at its interior to one of said members and projecting outwardly therefrom, the said body having embedded therewithin and bonded thereto a radially extending reinforcing plate of relatively stiff material united by vulcanization with the said body, and means for securing the outer portion of the said body to the other member.

2. A flexible coupling for a driving member and a driven member, the said coupling comprising a continuous ring-like body of deformable resilient material secured at its interior to one of said members and projecting outwardly therefrom, a radially extending annular reinforcing plate of relatively stiff material and of greater internal diameter than the external diameter of the portion of the member to which the ring-like body is secured and being of less external diameter than the external diameter of the said ring-like body, the said reinforcing plate having openings therethrough and being united by vulcanization to and within the ring-like body, and means for securing the outer portion of the said ring-like body to the other member.

3. A flexible coupling for a driving member and a driven member, the said coupling comprising a continuous ring-like body of deformable resilient material secured at its interior to one of said members and projecting outwardly therefrom, a radially extending annular reinforcing plate of relatively stiff material and of greater internal diameter than the external diameter of the portion of the first mentioned member to which the ring-like body is secured and being of less external diameter than the external diameter of the said ring-like body, the said reinforcing plate and the said body being united by vulcanization, and means for securing the outer portion of the ring-like body to the other of said members.

4. A flexible coupling for a driving member and a driven member, the said coupling comprising a continuous ring-like body of deformable resilient material secured at its interior to one of said members and projecting outwardly therefrom, a radially extending annular reinforcing plate of relatively stiff material and of greater internal diameter than the external diameter of the portion of the first mentioned member to which the ring-like body is secured and being of less external diameter than the external diameter of the said ring-like body, the said reinforcing plate having openings therethrough and being united by vulcanization to and within the ring-like body, a flanged projection carried by the other of said members and adapted to engage the opposite side and the opposite peripheral portion of said body, and bolts extending through such flanged projection and ring and through the body and through the reinforcing plate therewithin.

5. A flexible coupling for a driving member and a driven member, the said coupling comprising a continuous ring-like body of deformable resilient material secured at its interior to one of said members and projecting outwardly therefrom, a radially extending annular reinforcing plate of relatively stiff material and of greater internal diameter than the external diameter of the portion of the first mentioned member to which the ring-like body is secured and being of less external diameter than the external diameter of the said ring-like body, the said reinforcing plate having radial slots projecting inwardly thereinto from the periphery thereof and radial slots projecting outwardly thereinto from the interior thereof, the inwardly extending slots alternating with the outwardly extending slots and the said plate being united by vulcanization to and within the said body, a flanged projection carried by the other of said members and adapted to engage the side and a portion of the periphery of the said body, a cooperating flange adapted to engage the opposite side and the opposite peripheral portion of said body, and bolts extending through such flanged projection and ring and through the body and through the reinforcing plate therewithin.

6. A flexible coupling for a driving member and a driven member, the said coupling comprising a continuous ring-like body of deformable resilient material secured at its interior to one of said members and projecting outwardly therefrom, a radially extending annular reinforcing plate of relatively stiff material and of greater internal diameter than the external diameter of the portion of the first mentioned member to which the ring-like body is secured and being of less external diameter than the external diameter of the said ring-like body, the said reinforcing plate having radial slots projecting inwardly thereinto from the periphery thereof and radial slots projecting outwardly thereinto from the interior thereof, the inwardly extending slots alternating with the outwardly extending slots and the said plate being united by vulcanization to and within the said body, and means for securing the outer portion of said body to the other of the said members.

7. A flexible coupling for a driving member and a driven member, the said coupling comprising a continuous ring-like body of deformable resilient material having an outer relatively thick peripheral portion, an intermediate portion of materially less thickness and an inner relatively thick portion secured at its interior to one of said members and projecting outwardly therefrom, the said body having embedded therewithin, and substantially midway between the opposite sides thereof, a radially extending reinforcing plate of relatively stiff material united by vulcanization with the said body, the reinforcing plate being of greater internal diameter than the external diameter of the portion of the member to which the said ring-like body is secured and being of less external diameter than the external diameter of the said ring-like body, and means for securing the outer portion of the said body to the other member.

FREDERICK W. PETERS